United States Patent
DeLuca et al.

(10) Patent No.: US 10,572,497 B2
(45) Date of Patent: Feb. 25, 2020

(54) PARSING AND EXECUTING COMMANDS ON A USER INTERFACE RUNNING TWO APPLICATIONS SIMULTANEOUSLY FOR SELECTING AN OBJECT IN A FIRST APPLICATION AND THEN EXECUTING AN ACTION IN A SECOND APPLICATION TO MANIPULATE THE SELECTED OBJECT IN THE FIRST APPLICATION

(71) Applicant: INTERNATIONAL BUSINESS MACHINES CORPORATION, Armonk, NY (US)

(72) Inventors: Lisa Seacat DeLuca, Baltimore, MD (US); Lydia M. Do, Raleigh, NC (US); Charles M. Kinard, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 782 days.

(21) Appl. No.: 14/874,830

(22) Filed: Oct. 5, 2015

(65) Prior Publication Data

US 2017/0097750 A1    Apr. 6, 2017

(51) Int. Cl.
*G06F 16/248* (2019.01)
*G06F 3/0488* (2013.01)
(Continued)

(52) U.S. Cl.
CPC .......... *G06F 16/248* (2019.01); *G06F 3/0484* (2013.01); *G06F 3/0488* (2013.01); *G06F 3/04842* (2013.01); *G06F 3/04883* (2013.01); *G06F 17/242* (2013.01); *G06F 17/276* (2013.01)

(58) Field of Classification Search
CPC .. G06F 3/0484; G06F 3/0488; G06F 3/04883; G06F 17/242
See application file for complete search history.

(56) References Cited

U.S. PATENT DOCUMENTS 5,826,051 A * 10/1998 Porter ................... G06F 3/0481
715/810
8,271,908 B2   9/2012 Li et al.
(Continued)

OTHER PUBLICATIONS

Heater, B. "Panasonic's interactive plasma display means never having to clean another eraser"; Engadget; May 15, 2012, at 6:16 pm; <http://www.engadget.com/2012/05/15/panasonics-interactive-plasma-display-means-never-having-to-cle/.

*Primary Examiner* — Cesar B Paula
*Assistant Examiner* — Yahao Chen
(74) *Attorney, Agent, or Firm* — Tihon Poltavets

(57) ABSTRACT

A computer-implemented method for executing parsed commands includes receiving an area selection in a first user interface on an electronic device. The method receiving a first portion of a command entry in the first user interface. The method translating the first portion of the command entry into a first portion of computer readable text format. The method parsing the first portion of computer readable text format for keywords, wherein the keywords correspond to actions executed in a first application. Responsive to determining the first portion of computer readable text format matches a first action, the method executing the first action in the first application, wherein the first action is directed towards the area selection.

20 Claims, 5 Drawing Sheets

(51) Int. Cl.
*G06F 3/0484* (2013.01)
*G06F 17/24* (2006.01)
*G06F 17/27* (2006.01)

(56) References Cited

U.S. PATENT DOCUMENTS

| | | | |
|---|---|---|---|
| 8,552,996 B2 | 10/2013 | Morita | |
| 2005/0268249 A1* | 12/2005 | Colaco-Dias | G06F 3/0481 |
| | | | 715/793 |
| 2008/0294982 A1 | 11/2008 | Leung et al. | |
| 2009/0222770 A1* | 9/2009 | Chang | G06F 3/04883 |
| | | | 715/863 |
| 2010/0026642 A1* | 2/2010 | Kim | G06F 3/0416 |
| | | | 345/173 |
| 2010/0262591 A1* | 10/2010 | Lee | G06F 3/04883 |
| | | | 707/706 |
| 2012/0026081 A1 | 2/2012 | Kompalli et al. | |
| 2012/0166522 A1 | 6/2012 | MacLaurin et al. | |
| 2013/0321314 A1 | 12/2013 | Oh et al. | |
| 2014/0002379 A1* | 1/2014 | Hsieh | G06F 3/04883 |
| | | | 345/173 |
| 2014/0002380 A1 | 1/2014 | Li et al. | |
| 2014/0015780 A1 | 1/2014 | Kim et al. | |

\* cited by examiner

PARSING AND EXECUTING COMMANDS ON A USER INTERFACE RUNNING TWO APPLICATIONS SIMULTANEOUSLY FOR SELECTING AN OBJECT IN A FIRST APPLICATION AND THEN EXECUTING AN ACTION IN A SECOND APPLICATION TO MANIPULATE THE SELECTED OBJECT IN THE FIRST APPLICATION

BACKGROUND

The present invention relates generally to multi-touch electronic devices and more particularly to executing parsed commands on multi-touch electronic devices.

As capabilities of electronic devices, such as smart phones, expand over time, the number of applications a user might utilize on an electronic device expands as well. Examples of applications range from an internet web browser to a computer aided design program and each of these applications utilize a user interface through which a user can interact with the corresponding application. Due to the large quantity of applications, the user interfaces can vary from application to application. Electronic devices typically utilize multi-touch displays through which the user can access a user interface of the application to perform tasks.

SUMMARY

Embodiments of the present invention includes a method, computer program product and computer system for executing parsed commands. A computer-implemented method includes receiving, by one or more processors, an area selection in a first user interface on an electronic device; receiving, by one or more processors, a first portion of a command entry in the first user interface; translating, by one or more processors, the first portion of the command entry into a first portion of computer readable text format; parsing, by one or more processors, the first portion of computer readable text format for keywords, wherein the keywords correspond to actions executed in a first application; and responsive to determining the first portion of computer readable text format matches a first action, executing, by one or more processors, the first action in the first application, wherein the first action is directed towards the area selection.

DETAILED DESCRIPTION

Figure 1:
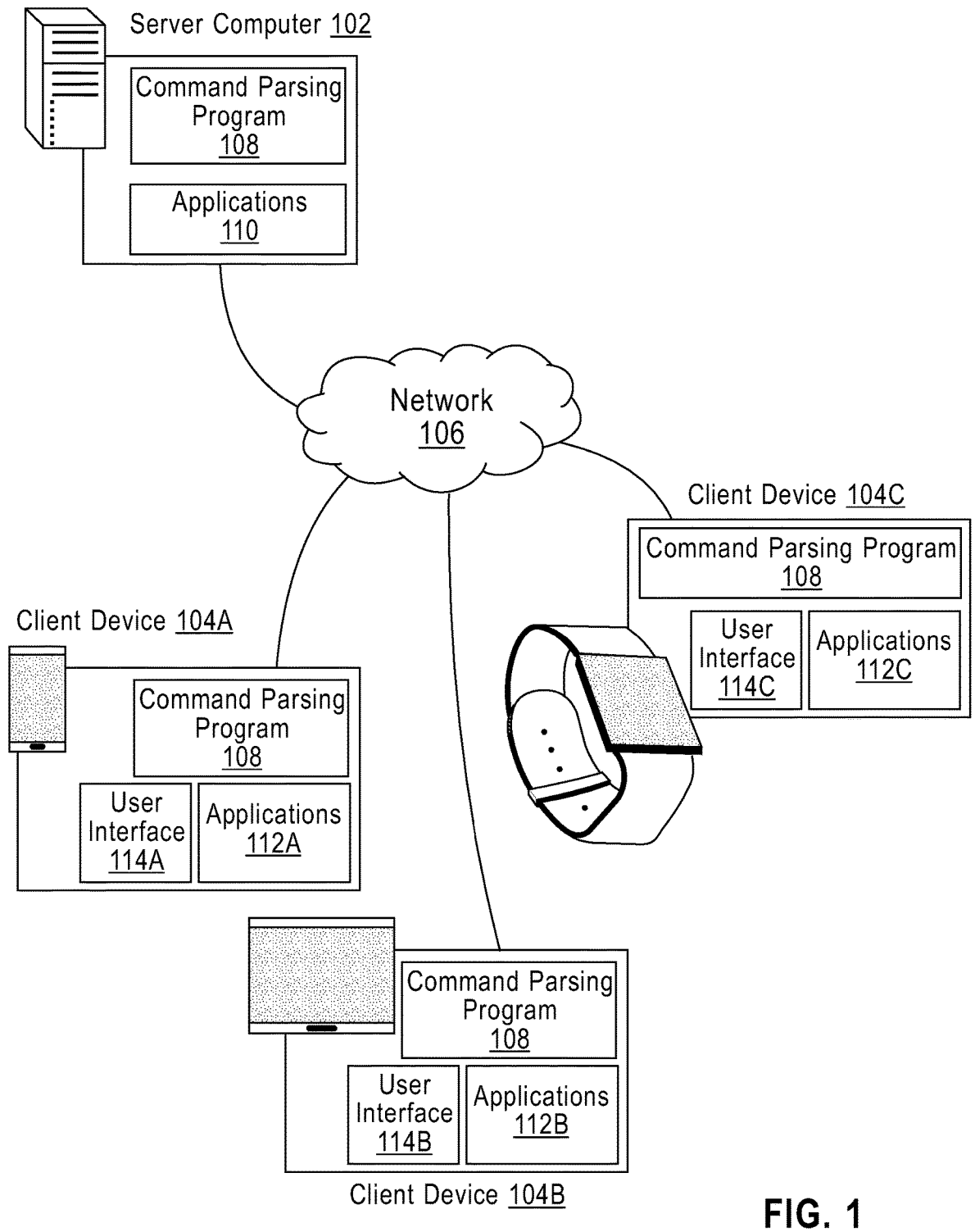
FIG. 1 is a functional block diagram illustrating a distributed data processing environment, in an embodiment in accordance with the present invention.

Example embodiments in accordance with the present invention will now be described in detail with reference to the drawing figures. FIG. 1 is a functional block diagram illustrating a distributed data processing environment. The distributed data processing environment includes server computer 102, client device 104A, client device 104B, and client device 104C interconnected over network 106.

Server computer 102 may be a desktop computer, a laptop computer, a tablet computer, a specialized computer server, a smartphone, or any other computer system known in the art. In certain embodiments, server computer 102 represents a computer system utilizing clustered computers and components that act as a single pool of seamless resources when accessed through network 106, as is common in data centers and with cloud computing applications. In general, server computer 102 is representative of any programmable electronic device or combination of programmable electronic devices capable of executing machine readable program instructions and communicating with other computer devices via a network. In this embodiment, server computer 102 includes command parsing program 108 and applications 110 accessible by client device 104A, 104B, and 104C, via network 106.

Client device 104A, 104B, and 104C may be laptop computers, tablet computers, netbook computers, personal computers (PC), desktop computers, personal digital assistants (PDA), smart phones, wearable devices (e.g., smart watches, personal fitness devices, personal safety devices), or any programmable computer systems known in the art with a multi-touch display. In certain embodiments, client device 104A, 104B, and 104C represent computer systems utilizing clustered computers and components (e.g., database server computers, application server computers, etc.) that act as a single pool of seamless resources when accessed through network 106, as is common in data centers and with cloud-computing applications. In general, client device 104A, 104B, and 104C are representative of any programmable electronic device or combination of programmable electronic devices capable of executing machine readable program instructions and communicating with users of client device 104A, 104B, and 104C, via network 106. Client device 104A, 104B, and 104C may include components, as depicted and described in further detail with respect to FIG. 5, in accordance with embodiments of the present invention.

Client device 104A, 104B, and 104C each include command parsing program 108. Command parsing program 108 can either operate in a client-side based setting, for example on client device 104A, or command parsing program 108 can operate in a server-side based setting, for example on server computer 102. Command parsing program 108 has the ability to receive an area selection in a user interface (e.g., user interface 114A) on a multi-touch display of a client device (e.g., client device 104A), along with a command written by a user in the selected area. Command parsing 108 has the ability to translate the written command into computer readable text format and parse the translated text format to identify possible actions specific to particular applications (e.g., applications 112A). Command parsing program 108 has the ability to match the translated text format to an action or match the translated text format to a number of possible actions. Command parsing program 108 has the ability to execute the matched action or display the number of possible actions to the user of client device 104A, 104B, or 104C.

Applications 112A, 112B, and 112C represent various forms of programs utilizing user interfaces 114A, 114B, and 114C to display content to users of client devices 104A, 104B, and 104C, respectively. Applications 110, 112A, 112B, and 112C can include programs, where each program is different from one another but may display commonly named actions in a user interface. In some embodiments, menu items in application 112A can exist in application 112B but perform different actions or a menu item in application 112A is located in a visible tab but the same menu item in application 112B is located in a sub-menu. For example, applications 112A can include program A and program B, where program A is a web browser and program B is a computer aided design program. However, client device 104A displays program A and program B in user interface 114A, both program A and program B display common actions such as "File" and "Edit".

Client device 104A, 104B, and 104C include user interface (UI) 114A, 114B, 114C, respectively and various programs (not shown). Examples of programs that client device 104A, 104B, and 104C include are: a web browser, an e-mail client, security software (e.g., a firewall program, a geo-locating program, an encryption program, etc.), an instant messaging (IM) application (app), and a communication (e.g., phone) application. In an example, a user of an client device 104A can interact with user interface 114A, such as a touch screen (e.g., display) that performs both input to a graphical user interface (GUI) and as an output device (e.g., a display) presenting a plurality of icons associated with software applications or images depicting the executing software application. Optionally, a software application (e.g., a web browser) can generate user interface 114A operating within the GUI of client device 104A.

User interface 114A, 114B, and 114C each accept input from a plurality of input/output (I/O) devices including, but not limited to, a tactile sensor interface (e.g., a touch screen, a touchpad) referred to as a multi-touch display. An I/O device interfacing with user interface 114A, 114B, and 114C may be connected to client device 104A, 104B, and 104C, respectively, which may operate utilizing wired (e.g., USB port) or wireless network communications (e.g., infrared, NFC, etc.).

In general, network 106 can be any combination of connections and protocols that will support communications among server computer 102 and client device 104A, 104B, and 104C. Network 106 can include, for example, a local area network (LAN), a wide area network (WAN), such as the internet, a cellular network, or any combination of the preceding, and can further include wired, wireless, and/or fiber optic connections. In one embodiment, command parsing program 108 can be a web service accessible via network 106 to a user of client device 104A, 104B, and 104C. In another embodiment, command parsing program 108 may be operated directly by a user of server computer 102.

Figure 2:
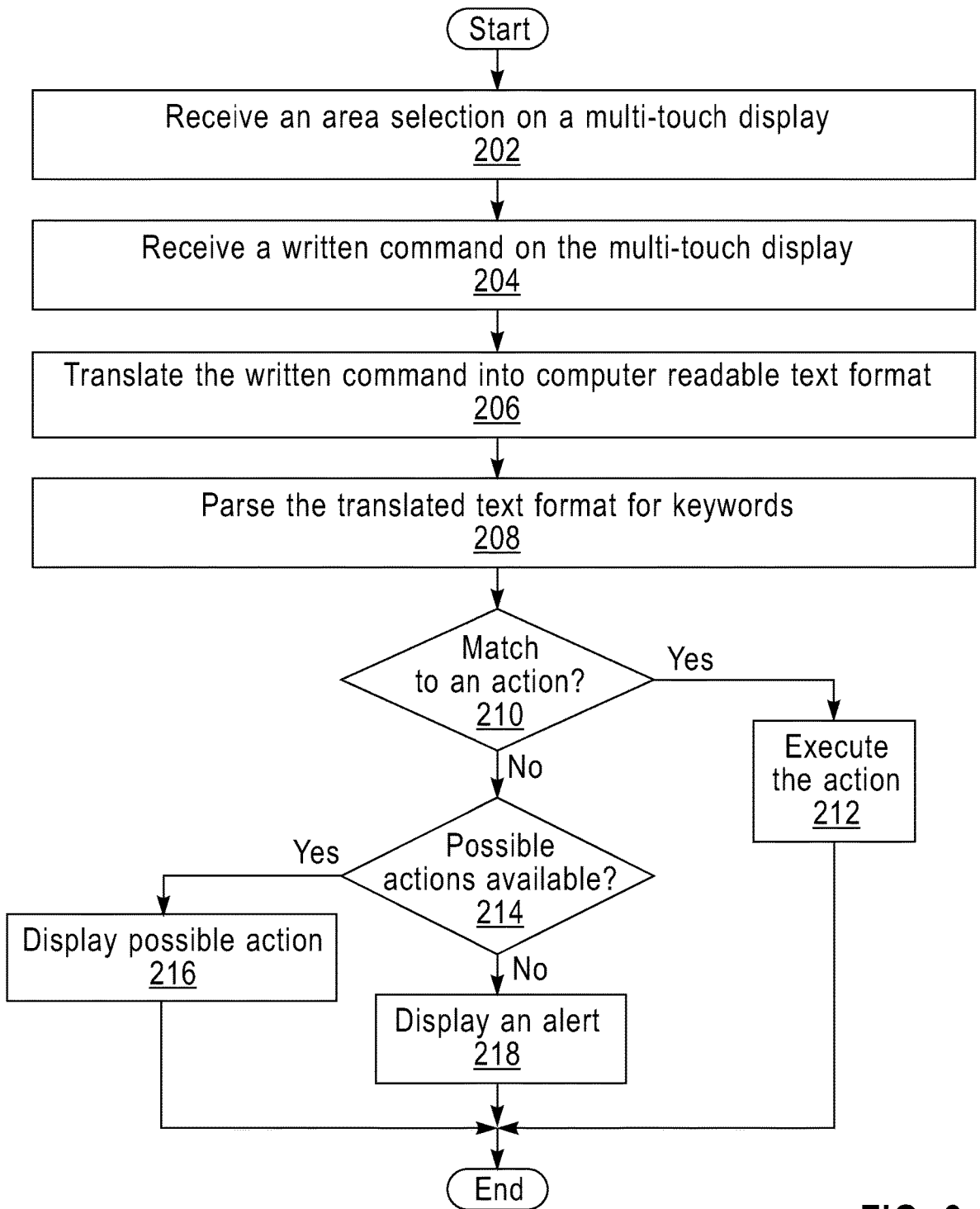
FIG. 2 is a flowchart depicting one embodiment of a command parsing program executing written commands, in accordance with the present invention.

FIG. 2 is a flowchart depicting one embodiment of a command parsing program executing written commands, in accordance with the present invention. As depicted, the method includes receiving (202) an area selection on a multi-touch display, receiving (204) a written command on the multi-touch display, translating (206) the written command into computer readable text format, parsing (208) the translated text format for keywords, determining (210) whether the parsed translated text matches an action, executing (212) the action, determining (214) whether possible actions are available, displaying (216) possible actions, and displaying (218) an alert. In one embodiment, the method is conducted by command parsing program 108.

The method may commence by receiving (202) an area selection on a multi-touch display. In this embodiment, command parsing program 108 receives an area selection in a user interface on a multi-touch display by the user outlining an area with his or her finger. The outlining area can form any shape, where an initial end point of the outlining area meets a final end point of the outlining area or an initial end point of the outlining area is in a vicinity of a final end point of the outlining area. Command parsing program 108 can also receive edits to the area selection subsequent to actually receiving the area selection. For example, command parsing program 108 can receive an expansion or reduction of the selected area by the user pinching or pulling the selected area with his or her fingers. Additionally, command parsing program 108 can display a magnification symbol or a reduction symbol next to the selected area, where command parsing program 108 can expand or reduce the selected area via a user input on the corresponding symbol.

In another embodiment, command parsing program 108 receives an area selection on a multi-touch display by a user physically touching a pre-defined area in the user interface. The pre-defined user interface can include, for example, an image or an embedded video on a webpage. Command parsing program 108 can receive the area selection of a pre-defined area by a user tapping twice on the pre-defined area or applying his or her finger on the pre-defined area for a predetermined amount of time (e.g., 1 second). Upon receiving the area selection, command parsing program 108 can keep the selected area in focus in the user interface, while putting the rest of the surrounding area out of focus in the user interface, thus ensuring that the user can determine that command parsing program 108 receives the correct area selection.

The method may continue by receiving (204) a written command on the multi-touch display. The written command represents an action the application is to execute, for example, a written command of "SAVE" represents an action of saving the selected area. Additionally, if multiple applications are active in the multi-touch display, command parsing program 108 can also receive an application name to which the written command is directed towards. For example, program AB and program CD represent two applications currently active in the multi-touch display. Command parsing program 108 can receive an area selection within program AB but can receive a written command, such as "SAVE CD", where the selected area from program AB is to be saved in program CD.

In this embodiment, command parsing program 108 receives a written command on the multi-touch display by the user using his or her finger to write a command in the user interface. The written command that command parsing program 108 receives is written within the bounds of the selected area to distinguish where the written command is directed towards. Alternatively, if command parsing program 108 keeps the selected area in focus while putting the surround area out of focus, command parsing program 108 can receive the written command outside the bounds of the selected area. In another embodiment, command parsing program 108 receives a written command on the multi-touch display via an electronic pen or stylus capable of writing commands in the user interface on the multi-touch display.

Command parsing program 108 can utilize a finite list of commands to enable auto-completion of a written command being received. For example, command parsing program 108 receives a written command "SA" and performs a search of the finite list of commands for commands beginning with "SA". Command parsing program 108 displays all the options from the finite list of commands in the user interface, where the user can select the desired command from the list of commands. If command parsing program 108 receives another letter in the written command "SAV", command parsing program 108 further reduces the displayed options from the finite list of commands in the user interface. If command parsing program 108 determines there is only one option left from the finite list of commands, command parsing program 108 displays the rest of the written command in the user interface. Command parsing program 108 can receive a verification of the auto-completed written command via a user input in the user interface, for example, a user double tapping the auto-completed written command if the written command is correct.

The method may continue by translating (206) the written command into computer readable text format. In this embodiment, command parsing program 108 utilizes handwriting-to-text translation software to translate a written command as command parsing program 108 receives each letter of the written command or after command parsing program 108 receives the completely written command. Command parsing program 108 receiving a single letter of the written command and translating the single letter, allows for the auto-completion feature previously discussed. Command parsing program 108 can utilize a list of computer readable text format commands, where each computer readable text command has an associated pre-defined written symbol or gesture. In one example, if command parsing program 108 receives a written command in the form of a drawn circle, command parsing program 108 can translate the drawn circle to a predefined "SAVE" computer readable text format command. In a second example, if command parsing program 108 receives a written command in the form of a drawn circle with a line going through the drawn circle, command parsing program 108 can translate the drawn circle with the line to a predefined "SAVE as .GIF" computer readable text format command.

The method may continue by parsing (208) the translated text format for keywords. In this embodiment, command parsing program 108 parses the translated text format for keywords referring to various options of the user interface for the application. The translated text can include a keyword, such as an application name, "AB" for program AB for instances where there are multiple applications active in the multi-touch display. The translated text can also include a keyword found in but not limited to, a menu, a toolbar, a title bar, or dock item (e.g., "SAVE"). Command parsing program 108 can parse the translated text and search throughout the user interface of the application to find the keywords. Additionally, command parsing program 108 can parse the translated text and utilizes a function (e.g., search function) of the application to further search the application for the action associated with the parsed translated text.

The method may continue by determining (210) whether the parsed translated text matches an action. In the event command parsing program 108 determines the parsed translated text matches an action ("yes" branch, 210), the method may continue by executing (212) the action. In the event command parsing program 108 determines the parsed translated text does not match an action ("no" branch, 210), the method may continue by determining (214) whether possible actions are available. Command parsing program 108 can utilize a threshold for determining whether the parsed translated text matches an action. For example, if the text of an action matches 90% or more of the parsed translated text, command parsing program 108 determines the parsed translated text matches the action. If the text of an action matches less than 90% of the parsed translated text, command parsing program 108 determines the parsed translated text does not match the action. However, the parsed translated text can still match a possible action based on another threshold, discussed in further detail with regards to (214).

The method may continue by executing (212) the action. In this embodiment, command parsing program 108 executes the action on the selected area of the multi-touch display or the selected content (e.g., image, embedded video etc.) in the application. Command parsing program 108 can execute the action in the application with or without user intervention. Executing the action with user intervention includes command parsing program 108 displaying the matched action in the user interface with options of whether the action is correct or incorrect. Command paring program 108 can execute the action and subsequent to the completion of the action, display a message to the user that the action was successful. Alternatively, command parsing program 108 can visually display the action to the user in the user interface in real time as it happens. For example, if the action is to "SAVE as .GIF", command parsing program 108 displays a curser selecting "File" in the application, selecting "Save As" in an open tab associated with "File", and saving the selected area or the selected content in ".GIF" format.

The method may continue by determining (214) whether possible actions are available. In the event command parsing program 108 determines possible actions are available ("yes" branch, 214), the method may continue by displaying (216) the possible actions. In the event command parsing program 108 determines possible actions are not available ("no" branch, 214), the method may continue by displaying (218) an alert. Command parsing program 108 can utilize an accuracy value threshold for determining whether possible actions are available. For example, if the text of an action matches 50% or more of the parsed translated text, command parsing program 108 identifies the action as a possible action. If the text of an action matches less than 50% of the parsed translated text, command parsing program 108 identifies the action as not a possible action.

The method may continue by displaying (216) possible actions. In this embodiment, command parsing program 108 displays the possible actions to the user in the multi-touch display, along with a re-entry option if the possible actions do not include the intended action of the written command. Command parsing program 108 can receive a selection of one of the possible actions via a user input and command parsing program 108 can execute the selected action. Command parsing program 108 can also query the user to store an association of the translated text format with the selected action. As a result, if command parsing program 108 receives the same written command, command parsing program 108 can match the action based on the previous association. Command parsing program 108 can also display the accuracy value which exceeds the threshold for each of the possible actions and provide suggestions to increase the accuracy value. An example of a possible suggestion is to utilize active tense when entering the written command, since an accuracy value for "SAVED" can vary from "SAVE".

The method may continue by displaying (218) an alert. In this embodiment, command parsing program 108 displays an alert to the user in the multi-touch display that no actions match the received written command. Command parsing program 108 can display an option to re-enter the written command or the user can manual perform the action, overriding command parsing program 108. In another embodiment, command parsing program 108 searches help content of the application and displays the results to the user, along with an alert that no actions match the received written command. For example, command parsing program 108 receives "convert" as a written command and command parsing program 108 determines there are no possible actions for the written command, "convert". Command parsing program 108 searches help content of the applications and determines "convert" is referenced the most in the "Save As" action of the application. Command parsing program 108 displays a first message that no possible actions match "convert" and a second message that queries the user if the "covert" command was meant to be a "Save As" command.

Figure 3:
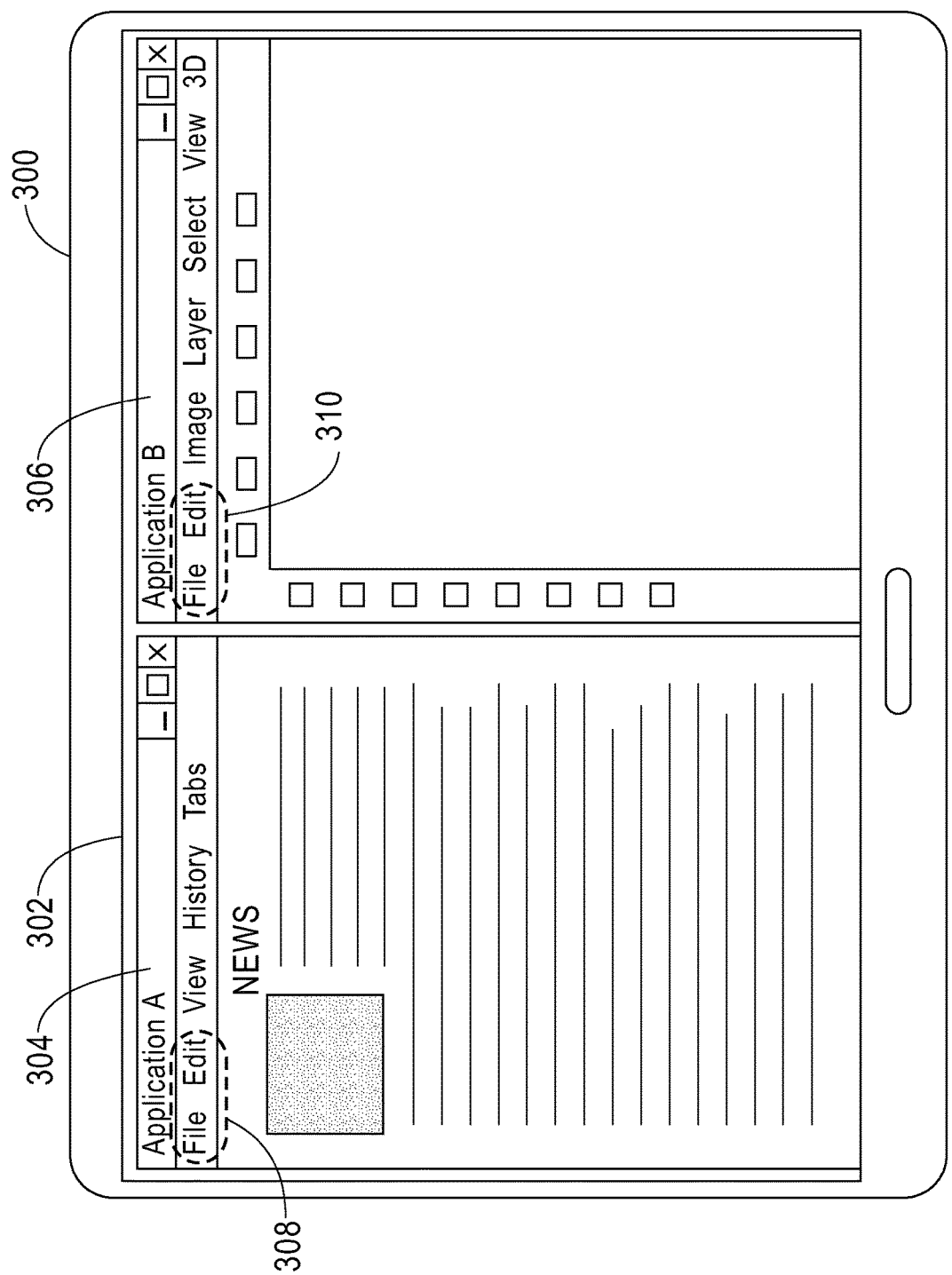
FIG. 3 illustrates an example scenario for parsing and executing commands with common actions across two user interfaces, in accordance with the present invention.

FIG. 3 illustrates an example scenario for parsing and executing commands with common actions across two user interfaces, in accordance with the present invention. In this example scenario, electronic device 300 utilizes multi-touch display 302 to display user interface 304 for application A and user interface 306 for application B. Application A represents a web browser displaying a news article and application B represents a computer aided design program. Application A and Application B each have unique and application specific menu items but also include some menu items that are shared across both application A and application B. Application A menu items 308 include "File" and "Edit", similar in title to menu items 310 of application B. Command parsing program 108 has the ability to receive an application name to which a written command is directed towards. For example, command parsing program 108 can receive a written command "File A" or "File App A" to represent an action of "File" in application A and alternatively, can received a written command "File B" or "File App B" to represent an action of "File" in application B. However, if command parsing program 108 receives a written command "History", command parsing program 108 determines the written command is directed to application A since the written command "History" is not present in user interface 306 of application B.

Figure 4:
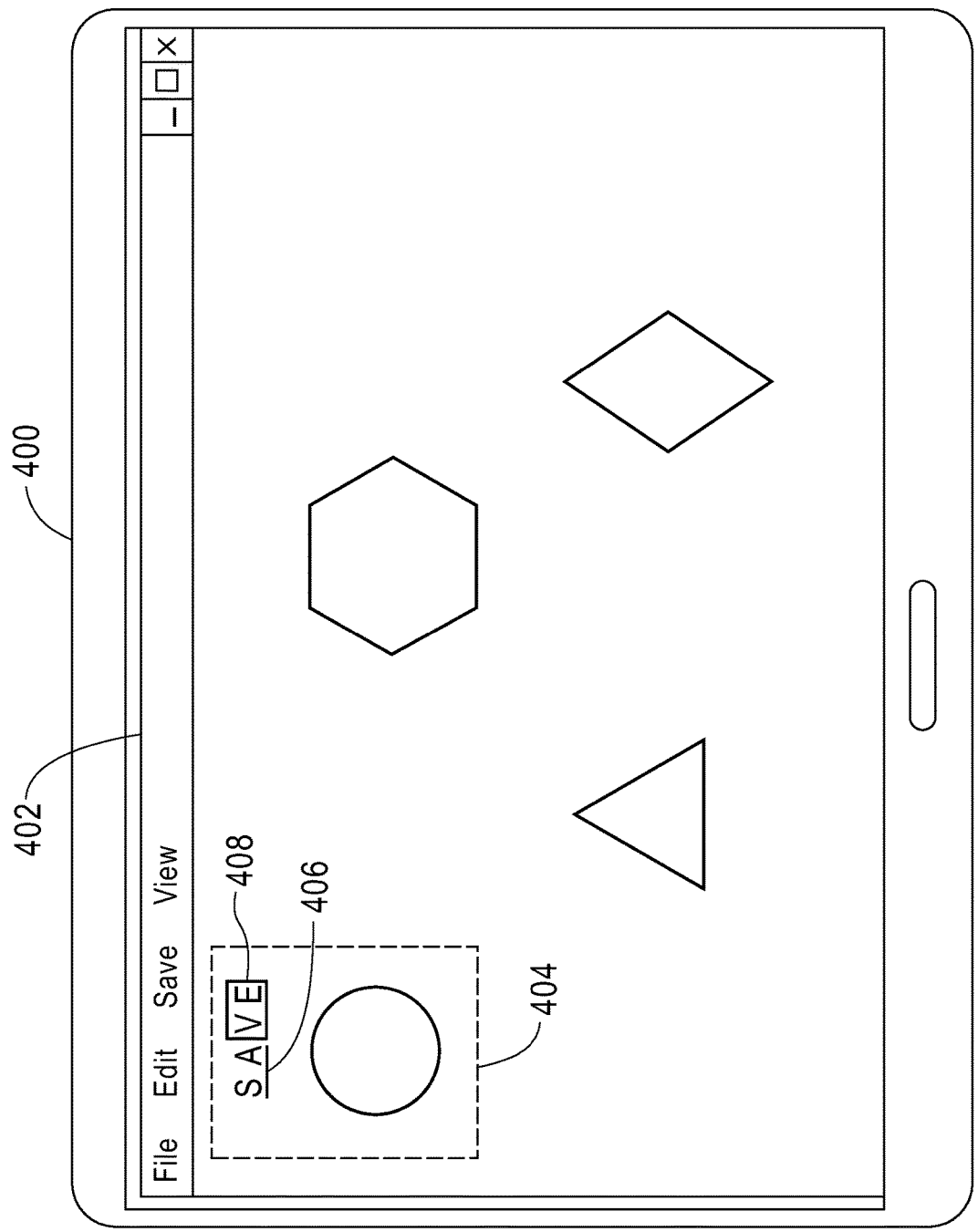
FIG. 4 illustrates an example scenario for parsing and executing commands, in accordance with the present invention.

FIG. 4 illustrates an example scenario for parsing and executing commands, in accordance with the present invention. In this example scenario, electronic device 400 utilizes a multi-touch display to display user interface 402 for a drawing application. In this embodiment, user interface 402 for the drawing application includes the following drawn shapes: a circle, a triangle, a hexagon, and a diamond. Command parsing program 108 receives area selection 404 through user interface 402 on the multi-touch display of electronic device 400. Area selection 404 includes an image of a drawn circle that a user wants to save separately from the other drawn images.

Command parsing program 108 receives a first letter (i.e., "S") and translates the first letter into a computer readable text format. Subsequently, command parsing program 108 receives a second letter (i.e., "A" and translates the second letter into computer readable text format. Based on the first and the second letter, command parsing program 108 is able to utilize a finite list of commands to enable auto-completion of the written command being received. In this example, command parsing program 108 receives portion 406 of the written command "SA" and command parsing program 108 performs a search of the finite list of commands beginning with "SA". Command parsing program 108 determines there is only one option from the finite list of commands, command parsing program 108 displays the rest of the written command (i.e., "VE") in user interface 402, represented by portion 408. Command parsing program 108 determines the written command matches the action and executes the action by saving the image in area selection 404 to the local device without further user interaction.

Figure 5:
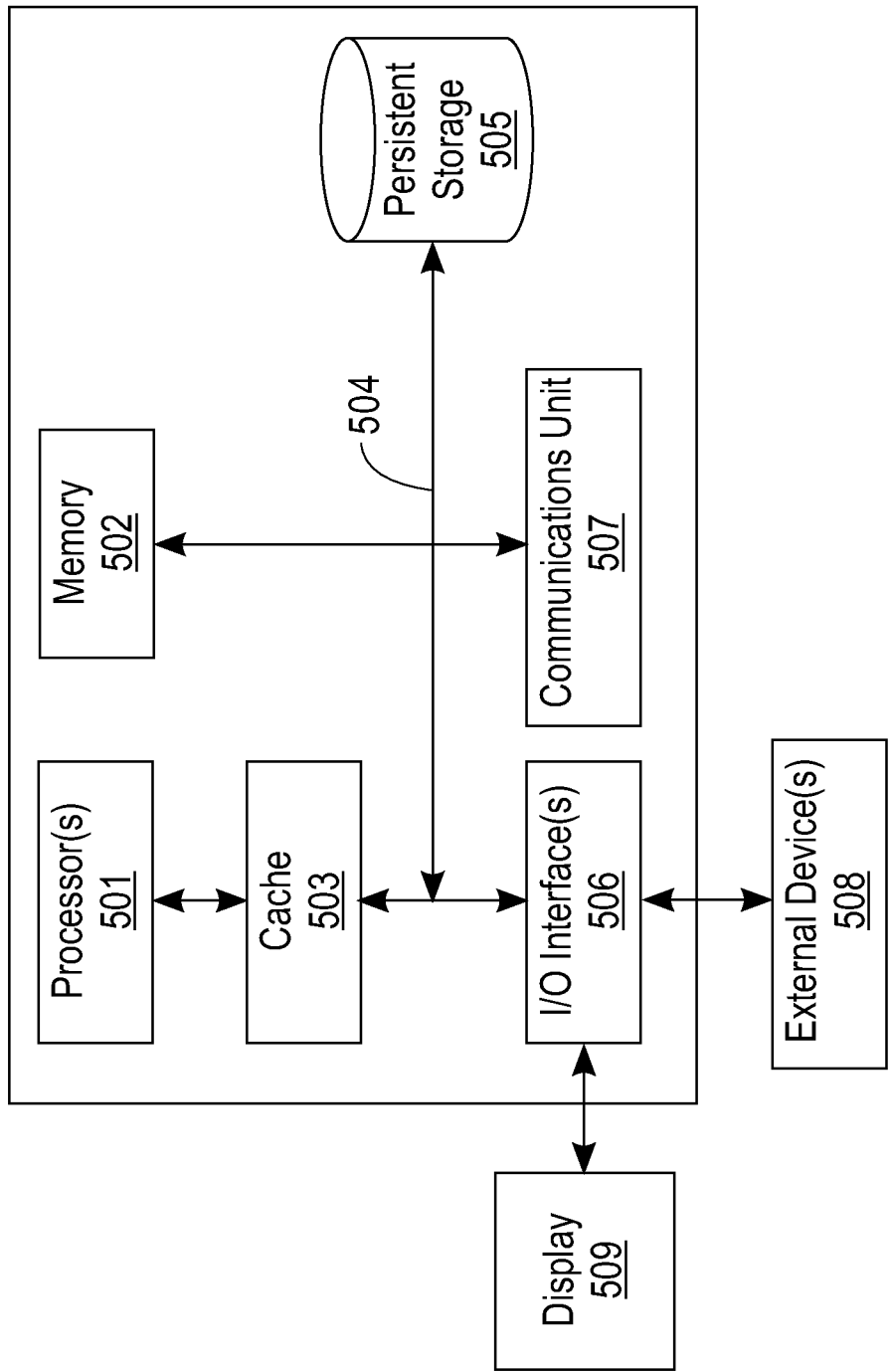
FIG. 5 is a block diagram of components of a computer system, such as the computer server of FIG. 1, in an embodiment in accordance with the present invention.

FIG. 5 depicts computer system 500, where server computer 102, client device 104A, 104B, and 104C are each an example of a system that includes command parsing program 108. The computer system includes processors 501, cache 503, memory 502, persistent storage 505, communications unit 507, input/output (I/O) interface(s) 506 and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface 506 may provide a connection to external devices 508 such as a keyboard, keypad, a touch screen, and/or some other suitable input device. External devices 508 can also include portable computer readable storage media such as, for example, thumb drives, portable optical or magnetic disks, and memory cards. Software and data used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:

displaying, by one or more processors, a first application and a second application simultaneously in a user interface on an electronic device, wherein the first application and the second application each include application specific menu items and shared menu items;

receiving, by one or more processors, an area selection in the user interface on the electronic device, wherein the area selection includes an object in the first application;

receiving, by one or more processors, a first portion of a command entry in the user interface directed to a first menu item out of the shared menu items of the first application and the second application, wherein the first application and the second application are each capable of executing the first portion of the command entry;

receiving, by one or more processors, a second portion of the command entry that includes an application selection out of the first application and the second application to which the first portion of the command entry is directed towards in the area selection;

translating, by one or more processors, the first portion of the command entry into a first portion of computer readable text format;

parsing, by one or more processors, the first portion of computer readable text format for keywords that correspond to actions executable in the second application based on the second portion of the command entry;

searching, by one or more processors, utilizing a search function in the second application, for an action associated with the parsed first portion of computer readable text;

responsive to determining, based on an accuracy value threshold, the first portion of computer readable text format matches a plurality of possible actions executable by the first menu item in the second application, displaying, by one or more processors, the plurality of possible actions and an accuracy value for each of the plurality of possible actions;

displaying, by one or more processors, a suggestion to increase the accuracy value, wherein the suggestion specifies utilizing an active tense for the first portion of the command entry; and responsive to receiving a user selection of a first action out of the plurality of possible actions, executing, by one or more processors, the first action by the first menu item in the second application according to a file format associated with the first action, wherein the first action is directed towards the object in the area selection in the first application.

2. The method of claim 1, further comprising:

searching, by one or more processors, a list of pre-defined commands for the first portion of the command entry; and responsive to identifying a first pre-defined command with the first portion of the command entry, generating, by one or more processors, a remaining portion of the command entry to complete the first pre-defined command in the user interface.

3. The method of claim 1, further comprising:

searching, by one or more processors, a list of pre-defined commands for the first portion of the command entry;

responsive to identifying a plurality of pre-defined commands with the first portion of the command entry, displaying, by one or more processor, the plurality of pre-defined commands in the user interface; and responsive to receiving a selection of a first pre-defined command from the plurality of pre-defined commands, generating, by one or more processors, a remaining portion of the command entry to complete the first pre-defined command in the user interface.

4. The method of claim 1, wherein executing the first action by the specific menu item in the second application based on the second portion of the command entry, further comprises:

displaying, by one or more processors, an automated visual representation for the execution of the first action in the second application.

5. The method of claim 1, further comprising:

subsequent to receiving the area selection in the user interface, displaying, by one or more processors, an area surrounding the area selection out of focus in the user interface, wherein the area selection that includes the object in the first application remains in focus in the user interface.

6. The method of claim 1, further comprising:

responsive to receiving a third portion of the command entry in the user interface, translating, by one or more processors, the third portion of the command entry into a second portion of computer readable text format;

responsive to parsing the second portion of computer readable text format for keywords, determining, by one or more processors, the second portion of computer readable text format matches a second action;

determining, by one or more processors, whether the second action is executable by either the first application or the second application based on the area selection; and responsive to determining the second action is not executable by the second application, executing, by one or more processors, the first action in the first application, wherein the first action is directed towards the area selection.

7. The method of claim 1, further comprising:

responsive to receiving a third portion of the command entry in the user interface, translating, by one or more processors, the third portion of the command entry into a second portion of computer readable text format;

responsive to parsing the second portion of computer readable text format for keywords, determining, by one or more processors, the second portion of computer readable text format matches a second action;

determining, by one or more processors, whether the second action is executable by either the first application or the second application based on the area selection; and responsive to determining the second action is not executable by the first application or the second application, displaying, by one or more processors, an alert to the user that second action is not executable by the first application or the second application in the area selection.

8. A computer program product comprising:

one or more non-transitory computer readable storage media and program instructions stored on at least one of the one or more non-transitory computer readable storage media, the program instructions comprising:

program instructions to display a first application and a second application simultaneously in a user interface on an electronic device, wherein the first application and the second application each include application specific menu items and shared menu items;

program instructions to receive an area selection in the user interface on the electronic device, wherein the area selection includes an object in the first application;

program instructions to receive a first portion of a command entry in the user interface directed to a first menu item out of the shared menu items of the first application and the second application, wherein the first application and the second application are each capable of executing the first portion of the command entry;

program instructions to receive a second portion of the command entry that includes an application selection out of the first application and the second application to which the first portion of the command entry is directed towards in the area selection;

program instructions to translate the first portion of the command entry into a first portion of computer readable text format;

program instructions to parse the first portion of computer readable text format for keywords that correspond to actions executable in the second application based on the second portion of the command entry;

program instructions to search utilizing a search function in the second application, for an action associated with the parsed first portion of computer readable text;

program instructions to, responsive to determining, based on an accuracy value threshold, the first portion of computer readable text format matches a plurality of possible actions executable by the first menu item in the second application, displaying, by one or more processors, the plurality of possible actions and an accuracy value for each of the plurality of possible actions;

program instructions to display a suggestion to increase the accuracy value, wherein the suggestion specifies utilizing an active tense for the first portion of the command entry; and program instructions to, responsive to receiving a user selection of a first action out of the plurality of possible actions, execute the first action by the first menu item in the second application according to a file format associated with the first action, wherein the first action is directed towards the object in the area selection in the first application.

9. The computer program product of claim 8, further comprising program instructions, stored on the one or more computer readable storage media, which when executed by a processor, cause the processor to:
search a list of pre-defined commands for the first portion of the command entry; and
responsive to identifying a first pre-defined command with the first portion of the command entry, generate a remaining of the command entry to complete the first pre-defined command in the user interface.

10. The computer program product of claim 8, further comprising program instructions, stored on the one or more computer readable storage media, which when executed by a processor, cause the processor to:
search a list of pre-defined commands for the first portion of the command entry;
responsive to identifying a plurality of pre-defined commands with the first portion of the command entry, display the plurality of pre-defined commands in the user interface; and
responsive to receiving a selection of a first pre-defined command from the plurality of pre-defined commands, generate a remaining portion of the command entry to complete the first pre-defined command in the user interface.

11. The computer program product of claim 8, wherein executing the first action by the specific menu item in the second application based on the second portion of the command entry, further comprising program instructions, stored on the one or more computer readable storage media, which when executed by a processor, cause the processor to:
display an automated visual representation for the execution of the first action in the second application.

12. The computer program product of claim 8, further comprising program instructions, stored on the one or more computer readable storage media, which when executed by a processor, cause the processor to:
subsequent to receiving the area selection in the user interface, display an area surrounding the area selection out of focus in the user interface, wherein the area selection that includes the object in the first application remains in focus in the user interface.

13. The computer program product of claim 8, further comprising program instructions, stored on the one or more computer readable storage media, which when executed by a processor, cause the processor to:
responsive to receiving a third portion of the command entry in the user interface, translate the third portion of the command entry into a second portion of computer readable text format;
responsive to parsing the second portion of computer readable text format for keywords, determine the second portion of computer readable text format matches a second action;
determine whether the second action is executable by either the first application or the second application based on the area selection; and
responsive to determining the second action is not executable by the second application, execute the first action in the first application, wherein the first action is directed towards the area selection.

14. The computer program product of claim 8, further comprising program instructions, stored on the one or more computer readable storage media, which when executed by a processor, cause the processor to:
responsive to receiving a third portion of the command entry in the user interface, translate the third portion of the command entry into a second portion of computer readable text format;
responsive to parsing the second portion of computer readable text format for keywords, determine the second portion of computer readable text format matches a second action;
determine whether the second action is executable by either the first application or the second application based on the area selection; and
responsive to determining the second action is not executable by the first application or the second application, display an alert to the user that second action is not executable by the first application or the second application in the area selection.

15. A computer system comprising:
one or more computer processors;
one or more computer readable storage media; and
program instructions stored on the computer readable storage media for execution by at least one of the one or more computer processors, the program instructions comprising:
program instructions to display a first application and a second application simultaneously in a user interface on an electronic device, wherein the first application and the second application each include application specific menu items and shared menu items;

program instructions to receive an area selection in the user interface on the electronic device, wherein the area selection includes an object in the first application;

program instructions to receive a first portion of a command entry in the user interface directed to a first menu item out of the shared menu items of the first application and the second application, wherein the first application and the second application are each capable of executing the first portion of the command entry;

program instructions to receive a second portion of the command entry that includes an application selection out of the first application and the second application to which the first portion of the command entry is directed towards in the area selection;

program instructions to translate the first portion of the command entry into a first portion of computer readable text format;

program instructions to parse the first portion of computer readable text format for keywords that correspond to actions executable in the second application based on the second portion of the command entry;

program instructions to search utilizing a search function in the second application, for an action associated with the parsed first portion of computer readable text;

program instructions to, responsive to determining, based on an accuracy value threshold, the first portion of computer readable text format matches a plurality of possible actions executable by the first menu item in the second application, displaying, by one or more processors, the plurality of possible actions and an accuracy value for each of the plurality of possible actions;

program instructions to display a suggestion to increase the accuracy value, wherein the suggestion specifies utilizing an active tense for the first portion of the command entry; and program instructions to, responsive to receiving a user selection of a first action out of the plurality of possible actions, execute the first action by the first menu item in the second application according to a file format associated with the first action, wherein the first action is directed towards the object in the area selection in the first application.

16. The computer system of claim 15, further comprising program instructions, stored on the one or more computer readable storage media, which when executed by a processor, cause the processor to:

search a list of pre-defined commands for the first portion of the command entry; and responsive to identifying a first pre-defined command with the first portion of the command entry, generate a remaining portion of the command entry to complete the first pre-defined command in the user interface.

17. The computer system of claim 15, further comprising program instructions, stored on the one or more computer readable storage media, which when executed by a processor, cause the processor to:

search a list of pre-defined commands for the first portion of the command entry;

responsive to identifying a plurality of pre-defined commands with the first portion of the command entry, display the plurality of pre-defined commands in the user interface; and responsive to receiving a selection of a first pre-defined command from the plurality of pre-defined commands, generate a remaining portion of the command entry to complete the first pre-defined command in the user interface.

18. The computer system of claim 15, wherein executing the first action by the specific menu item in the second application based on the second portion of the command entry, further comprising program instructions, stored on the one or more computer readable storage media, which when executed by a processor, cause the processor to:

display an automated visual representation for the execution of the first action in the second application.

19. The computer system of claim 15, further comprising program instructions, stored on the one or more computer readable storage media, which when executed by a processor, cause the processor to:

responsive to receiving a third portion of the command entry in the user interface, translate the third portion of the command entry into a second portion of computer readable text format;

responsive to parsing the second portion of computer readable text format for keywords, determine the second portion of computer readable text format matches a second action;

determine whether the second action is executable by either the first application or the second application based on the area selection; and responsive to determining the second action is not executable by the second application, execute the first action in the first application, wherein the first action is directed towards the area selection.

20. The computer system of claim 15, further comprising program instructions, stored on the one or more computer readable storage media, which when executed by a processor, cause the processor to:

responsive to receiving a third portion of the command entry in the user interface, translate the third portion of the command entry into a second portion of computer readable text format;

responsive to parsing the second portion of computer readable text format for keywords, determine the second portion of computer readable text format matches a second action;

determine whether the second action is executable by either the first application or the second application based on the area selection; and responsive to determining the second action is not executable by the first application or the second application, display an alert to the user that second action is not executable by the first application or the second application in the area selection.

* * * * *